United States Patent
Jacobson et al.

(10) Patent No.: US 9,477,511 B2
(45) Date of Patent: Oct. 25, 2016

(54) TASK-BASED MODELING FOR PARALLEL DATA INTEGRATION

(71) Applicant: International Business Machines Corporation, Armonk, NY (US)

(72) Inventors: Eric A. Jacobson, Arlington, MA (US); Yong Li, Newton, MA (US); Shyam R. Mudambi, Wayland, MA (US); Xiaoyan Pu, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

(21) Appl. No.: 13/966,903

(22) Filed: Aug. 14, 2013

(65) Prior Publication Data

US 2015/0052530 A1 Feb. 19, 2015

(51) Int. Cl.
G06F 9/44 (2006.01)
G06F 9/46 (2006.01)
G06F 9/50 (2006.01)

(52) U.S. Cl.
CPC .............. *G06F 9/46* (2013.01); *G06F 9/5066* (2013.01)

(58) Field of Classification Search
None
See application file for complete search history.

(56) References Cited

U.S. PATENT DOCUMENTS

| | | | |
|---|---|---|---|
| 5,752,030 A | 5/1998 | Konno et al. |
| 5,857,180 A | 1/1999 | Hallmark et al. |
| 5,996,088 A | 11/1999 | Frank et al. |
| 6,434,664 B1 | 8/2002 | Buch et al. |
| 6,549,928 B1 | 4/2003 | Mason et al. |

(Continued)

FOREIGN PATENT DOCUMENTS

| | | |
|---|---|---|
| CN | 101799809 A | 8/2010 |
| CN | 102063336 A | 5/2011 |
| JP | 2012118669 A | 6/2012 |

OTHER PUBLICATIONS

U.S. Appl. No. 13/842,484, entitled Data Integration on Retargetable Engines in a Networked Environment, filed Mar. 15, 2013.

(Continued)

*Primary Examiner* — Philip Wang
(74) *Attorney, Agent, or Firm* — Patterson + Sheridan, LLP

(57) ABSTRACT

System, method, and computer program product to perform an operation for task-based modeling for parallel data integration, by determining, for a data flow, a set of processing units, each of the set of processing units defining one or more data processing operations to process the data flow, generating a set of tasks to represent the set of processing units, each task in the set of tasks comprising one or more of the data processing operations of the set of processing units, optimizing the set of tasks based on a set of characteristics of the data flow, and generating a composite execution plan based on the optimized set of tasks to process the data flow in a distributed computing environment.

13 Claims, 4 Drawing Sheets

(56) References Cited

U.S. PATENT DOCUMENTS

| | | | |
|---|---|---|---|
| 6,584,581 B1 | 6/2003 | Bay et al. | |
| 6,654,907 B2 | 11/2003 | Stanfill et al. | |
| 6,725,211 B1 | 4/2004 | Ashton et al. | |
| 6,983,234 B1 | 1/2006 | Hangal et al. | |
| 7,337,444 B2 | 2/2008 | Browning et al. | |
| 7,664,940 B2 | 2/2010 | Conklin et al. | |
| 7,769,717 B2 | 8/2010 | Federwisch et al. | |
| 7,873,719 B2 | 1/2011 | Bishop et al. | |
| 7,895,474 B2 | 2/2011 | Collins et al. | |
| 8,015,541 B1 | 9/2011 | Srinivasan et al. | |
| 8,015,564 B1 | 9/2011 | Beyer et al. | |
| 8,129,848 B2 | 3/2012 | Lee | |
| 8,166,479 B2* | 4/2012 | Roberts et al. | 718/100 |
| 8,219,848 B2 | 7/2012 | Branson et al. | |
| 8,224,986 B1 | 7/2012 | Liskov et al. | |
| 8,266,477 B2 | 9/2012 | Mankovskii et al. | |
| 8,572,051 B1 | 10/2013 | Chen et al. | |
| 8,825,599 B2 | 9/2014 | Goldberg et al. | |
| 2002/0055868 A1 | 5/2002 | Dusevic et al. | |
| 2002/0152432 A1 | 10/2002 | Fleming | |
| 2002/0188653 A1 | 12/2002 | Sun | |
| 2002/0194248 A1 | 12/2002 | Wood et al. | |
| 2003/0135621 A1 | 7/2003 | Romagnoli | |
| 2005/0188364 A1 | 8/2005 | Cockx et al. | |
| 2006/0080285 A1 | 4/2006 | Chowdhuri | |
| 2006/0136279 A1 | 6/2006 | Maybee et al. | |
| 2006/0156157 A1 | 7/2006 | Haselden et al. | |
| 2006/0294435 A1 | 12/2006 | Vick et al. | |
| 2007/0067373 A1 | 3/2007 | Higgins et al. | |
| 2007/0094214 A1 | 4/2007 | Li et al. | |
| 2007/0266368 A1 | 11/2007 | Szpak et al. | |
| 2007/0266384 A1 | 11/2007 | Labrou et al. | |
| 2008/0263555 A1 | 10/2008 | Ventroux et al. | |
| 2008/0307255 A1* | 12/2008 | Chen | G06F 11/1471 714/13 |
| 2009/0007127 A1 | 1/2009 | Roberts et al. | |
| 2009/0187756 A1 | 7/2009 | Nollet et al. | |
| 2009/0260009 A1 | 10/2009 | Pinto et al. | |
| 2009/0265707 A1 | 10/2009 | Goodman et al. | |
| 2010/0122065 A1 | 5/2010 | Dean et al. | |
| 2010/0205619 A1 | 8/2010 | Barsness et al. | |
| 2010/0241828 A1 | 9/2010 | Yu et al. | |
| 2011/0016214 A1 | 1/2011 | Jackson | |
| 2011/0016354 A1 | 1/2011 | Douros et al. | |
| 2011/0061057 A1 | 3/2011 | Harris et al. | |
| 2011/0078499 A1 | 3/2011 | Fong et al. | |
| 2011/0145392 A1 | 6/2011 | Dawson et al. | |
| 2011/0145830 A1 | 6/2011 | Yamaguchi | |
| 2011/0154341 A1 | 6/2011 | Pueyo et al. | |
| 2011/0173289 A1 | 7/2011 | Chen et al. | |
| 2011/0173488 A1 | 7/2011 | Blumrich et al. | |
| 2011/0238797 A1 | 9/2011 | Wee | |
| 2011/0302583 A1 | 12/2011 | Abadi et al. | |
| 2012/0011401 A1 | 1/2012 | Ranganathan et al. | |
| 2012/0079497 A1 | 3/2012 | Gangemi et al. | |
| 2012/0102189 A1 | 4/2012 | Burge et al. | |
| 2012/0151198 A1 | 6/2012 | Gupta et al. | |
| 2012/0304003 A1 | 11/2012 | Goldstein et al. | |
| 2012/0317579 A1 | 12/2012 | Liu | |
| 2013/0247069 A1 | 9/2013 | Chen et al. | |
| 2014/0040855 A1* | 2/2014 | Wang | G06F 9/4436 717/107 |
| 2014/0059552 A1 | 2/2014 | Cunningham et al. | |
| 2014/0208169 A1 | 7/2014 | Randhir et al. | |
| 2014/0215471 A1* | 7/2014 | Cherkasova et al. | 718/102 |
| 2014/0280159 A1* | 9/2014 | Cao et al. | 707/737 |
| 2014/0280441 A1 | 9/2014 | Jacobson et al. | |
| 2014/0281704 A1 | 9/2014 | Jacobson et al. | |
| 2014/0282563 A1 | 9/2014 | Jacobson et al. | |
| 2014/0282604 A1 | 9/2014 | Jacobson et al. | |
| 2014/0282605 A1 | 9/2014 | Jacobson et al. | |
| 2014/0359624 A1* | 12/2014 | Cherkasova et al. | 718/100 |
| 2014/0372611 A1* | 12/2014 | Matsuda et al. | 709/225 |
| 2015/0074669 A1 | 3/2015 | Jacobson et al. | |

OTHER PUBLICATIONS

U.S. Appl. No. 13/843,425, entitled Qualified Checkpointing of Data Flows in a Processing Environment, filed Mar. 15, 2013.

U.S. Appl. No. 13/842,960, entitled Deploying Parallel Data Integration Applications to Distributed Computing Environments, filed Mar. 15, 2013.

Ferkouss, Omar El et al., Performance model for mapping processing tasks to OpenFlow switch resources, 2012 IEEE International Conference on Communications, Jun. 2012, IEEE, Piscataway, United States.

Kirischian, Lev, Optimization of Parallel Task Execution on the Adaptive Reconfigurable Group Organized Computing System, Proceedings of the International Conference on Parallel Computing in Electrical Engineering, 2000, IEEE, Piscataway, United States.

Wang, Bo et al., Task optimization based on CPU pipeline technique in a multicore system, Computers & Mathematics with Applications, Jan. 2012, vol. 63, Issue 2, Pergamon Press, Inc., Tarrytown, United States.

Vandierendonck, Hans et al., Parallel Programming of General-Purpose Programs Using Task-Based Programming Models, Proceedings of the 3rd USENIX conference on Hot topic in parallelism, 2011, USENIX Association, Berkeley, United States.

Varisteas, Georgios, et al., Resource management for task-based parallel programs over a multi-kernel, Proceedings of the 2012 workshop on Runtime Environments, Systems, Layering and Virtualized Environments, 2012, Association for Computing Machinery (ACM), New York, United States.

Patent Cooperation Treaty, Search Report and Written Opinion for International Application No. PCT/IB2014/059199, dated May 27, 2014.

U.S. Appl. No. 14/485,362, entitled "Task-Based Modeling for Parallel Data Integration", filed Sep. 12, 2014.

U.S. Appl. No. 14/224,640, entitled "Deploying Parallel Data Integration Applications to Distributed Computing Environments", filed Mar. 25, 2014.

U.S. Appl. No. 14/224,523, entitled "Qualified Checkpointing of Data Flows in a Processing Environment", filed Mar. 25, 2014.

Anonymous, Methods for Application Checkpointing using Application Dependence Analysis, IP.com: Prior Art Database, Oct. 16, 2012, IP.COM, Fairport, United States.

Motorola et al., Selective Session Recovery Based on Domain Specific Prioritization Criteria, IP.com: Prior Art Database, Feb. 21, 2012, IP.COM, Fairport, United States.

Anonymous, Optimal checkpoint interval based on intelligent model using database interval factors, IP.com: Prior Art Database, Feb. 3, 2012, IP.COM, Fairport, United States.

Various Universities, On the Optimum Checkpoint Selection Problem, IP.com: Prior Art Database, Mar. 29, 2007, IP.COM, Fairport, United States.

* cited by examiner

TASK-BASED MODELING FOR PARALLEL DATA INTEGRATION

BACKGROUND

The present disclosure relates to computer software, and more specifically, to computer software to implement task-based modeling for parallel data integration.

An existing parallel execution environment for data integration may take one of four configurations: symmetric multiprocessing (SMP), massive parallel processing (MPP), cluster, or grid. SMP contains one physical server, while the other parallel execution environments support multiple physical servers. Those servers may be further configured to serve as compute nodes, I/O nodes, or database nodes.

A distributed computing environment can be setup in a much larger scale with hundreds to thousands of servers. To run parallel jobs in a distributed computing environment, the parallel computing engine must be integrated with the distributed computing engine, as each may have their own specific run models. The parallel engine supports the process-based model, while the distributed engine supports the task-based model. In the task-based model, a data flow consists of subflows, and each subflow is considered a task. A task may be run through one or more processing units determined by the process-based model. When attempting to run parallel jobs in the distributed computing environment, a task-based execution plan based on a process execution plan must be created.

SUMMARY

Embodiments disclosed herein provide a system, method, and computer program product to perform an operation for task-based modeling for parallel data integration, by determining, for a data flow, a set of processing units, each of the set of processing units defining one or more data processing operations to process the data flow, generating a set of tasks to represent the set of processing units, each task in the set of tasks comprising one or more of the data processing operations of the set of processing units, optimizing the set of tasks based on a set of characteristics of the data flow, and generating a composite execution plan based on the optimized set of tasks to process the data flow in a distributed computing environment.

DETAILED DESCRIPTION

Figure 1:
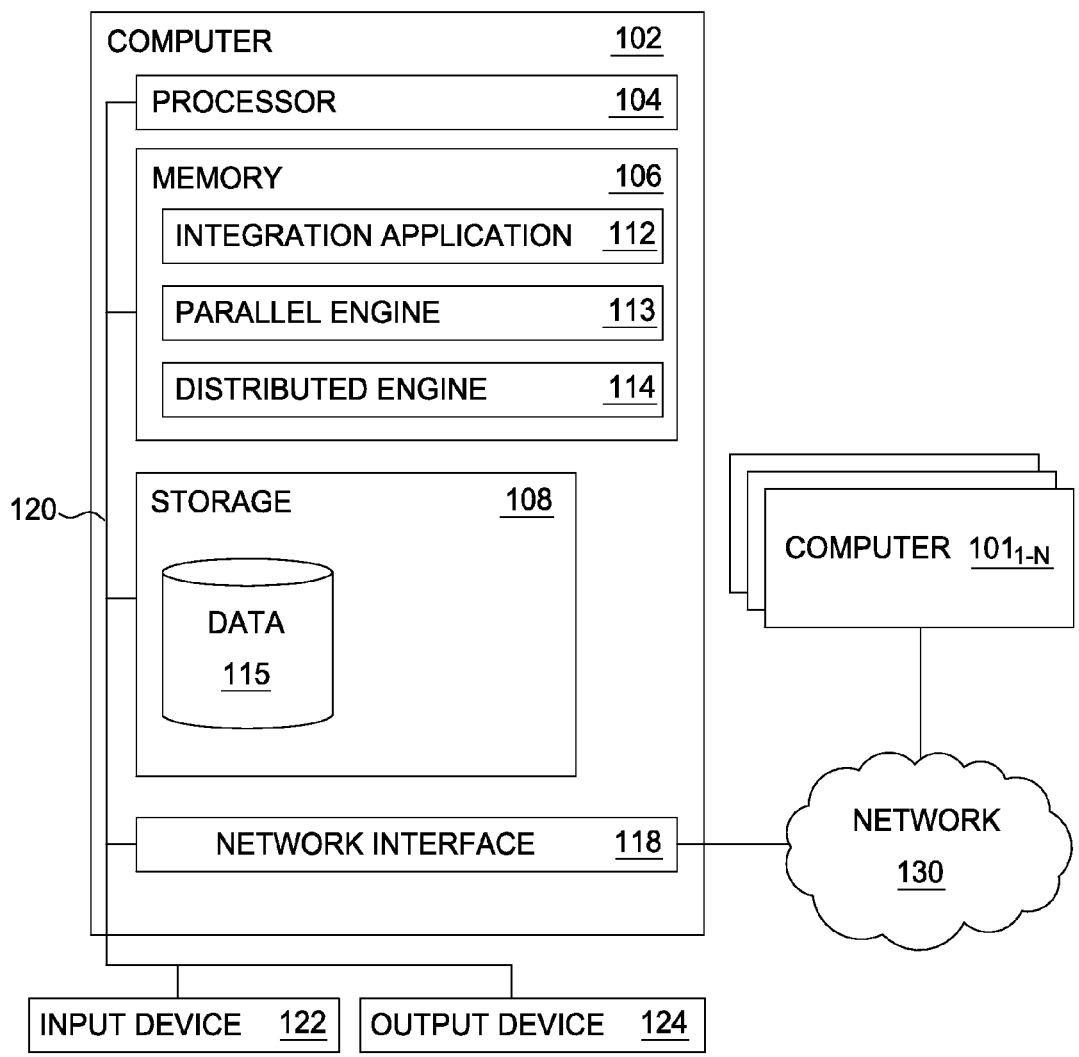
FIG. 1 illustrates a system for task-based modeling for parallel data integration, according to one embodiment.

Embodiments disclosed herein provide a task-based processing model that can be applied to generate an optimal execution plan for running existing data integration applications in distributed computing environments. Generally, embodiments disclosed herein generate an optimal execution plan based on checkpointing needs, resource utilization patterns, partitioning and sort keys, and runtime requirements.

A data flow may be modeled as a set of tasks (for a task-based processing model), with each task having a function. Each task may contain one or more processing units to perform the function. The functions of all tasks may be orchestrated to represent the application logic of the entire data flow. For a given data flow, the number of tasks may range from 1 to N, where N is the maximum number of processing units. The optimal number of tasks, i.e., the number of tasks which would most efficiently process the data flow, is also a number from 1 to N. Embodiments disclosed herein determine the optimal number of tasks by considering characteristics of the data flow, such as checkpointing needs, resource utilization patterns, partitioning and sort keys, as well as performance requirements that may be specified by a user at runtime. Based on the optimal number of tasks, a two-level composite optimal execution plan may be generated for running those tasks in a distributed computing environment.

For example, the following data flow may join data from two sources, transform the data, and load data into a target file system. A first import operator may pass its results to a first sort operator. The first sort operator may pass its results to a first remove duplicate operator. In parallel, a second import operator may pass its results to a second sort operator. The second sort operator may then pass its results to a second remove duplicate operator. The results of the first and second remove duplicate operator may then be passed to a join operator, which then flows to a transform operator, which finally flows to an export operator.

Applying a process-based model to this sample data flow may result in nine distinct processes in a single node configuration if operator combining (combining two or more operators) is disabled, namely one process for each step in the data flow. Applying task-based modeling to the process execution plan, embodiments disclosed herein may generate many different task execution plans, as illustrated in Table I:

TABLE I

| Plan Name | Rule | Number of Tasks | Task Name | Function of Task | Processes in Task |
| --- | --- | --- | --- | --- | --- |
| Plan 1 | Map-reduce tasks | 2 | Task 1 | Read and join data | Import1, Import2, Sort1, Sort2, RemoveDuplicate1, RemoveDuplicate2, Join |
| | | | Task 2 | Transform and export data | Transform, Export |
| Plan 2A | Based on plan 1, separate data import from map-reduce | 3 | Task 1 | Read data | Import1, Import2 |
| | | | Task 2 | Join data | Sort1, Sort2, RemoveDuplicate1, RemoveDuplicate2, Join |
| | | | Task 3 | Transform and export data | Transform, Export |

TABLE I-continued

| Plan Name | Rule | Number of Tasks | Task Name | Function of Task | Processes in Task |
|---|---|---|---|---|---|
| Plan 2B | Based on plan 1, separate memory intensive from data processing | 4 | Task 1 | Read and remove duplicate data from source 1 | Import1, Sort1, RemoveDuplicate1 |
| | | | Task 2 | Read and remove duplicate data from source 2 | Import2, Sort2, RemoveDuplicate2 |
| | | | Task 3 | Join data | Join |
| | | | Task 4 | Transform and export data | Transform, Export |
| Plan 2C | Based on plan 1, separate two data sources from map-reduce | 4 | Task 1 | Read data from data source 1 | Import1 |
| | | | Task 2 | Read data from data source 2 | Import2 |
| | | | Task 3 | Join data | Sort1, Sort2, RemoveDuplicate1, RemoveDuplicate2, Join |
| | | | Task 4 | Transform and export data | Transform, Export |
| Plan 3 | Based on plan 2a, separate I/O (data import and export) from data processing | 4 | Task 1 | Read data | Import1, Import2 |
| | | | Task 2 | Join data | Sort1, Sort2, RemoveDuplicate1, RemoveDuplicate2, Join |
| | | | Task 3 | Transform data | Transform |
| | | | Task 4 | Export data | Export |
| Plan 4 | Based on plan 3, input I/O on different servers | 5 | Task 1 | Read data from data source 1 | Import1 |
| | | | Task 2 | Read data from data source 2 | Import2 |
| | | | Task 3 | Join data | Sort1, Sort2, RemoveDuplicate1, RemoveDuplicate2, Join |
| | | | Task 4 | Transform data | Transform |
| | | | Task 5 | Export data | Export |
| Plan 5 | Based on plan 4, input I/O on different servers, also separate memory-intensive from CPU-intensive | 6 | Task 1 | Read data from data source 1 | Import1 |
| | | | Task 2 | Read data from data source 2 | Import2 |
| | | | Task 3 | Remove duplicate data | Sort1, Sort2, RemoveDuplicate1, RemoveDuplicate2 |
| | | | Task 4 | Join data | Join |
| | | | Task 5 | Transform data | Transform |
| | | | Task 6 | Export data | Export |
| Plan 6 | Based on plan 5, separate two map-reduce tasks for removing duplicate records | 7 | Task 1 | Read data from data source 1 | Import1 |
| | | | Task 2 | Read data from data source 2 | Import2 |
| | | | Task 3 | Remove duplicate data from data source 1 | Sort1, RemoveDuplicate1 |
| | | | Task 4 | Remove duplicate data from data source 2 | Sort2, RemoveDuplicate2 |
| | | | Task 5 | Join data | Join |
| | | | Task 6 | Transform data | Transform |
| | | | Task 7 | Export data | Export |

Table I illustrates that many different execution plans may be generated. Advantageously, embodiments disclosed herein may generate an optimal execution plan based on checkpointing needs, resource utilization patterns, partitioning and sort keys, as well as performance requirements that may be specified by a user at runtime. For example, in a first scenario based on the above-illustrated data flow, if it is determined at runtime that both data sources are local and have medium data volume, embodiments disclosed herein may identify plan 2A as being optimal, as both join and file export can work with key and value pairs. In this plan, the operators upstream from the join operator can be grouped as the map task, while the join operator itself can be used as the reduce task. In the second map-reduce task, the transform operator is the map task, and the file export is the reduce task. There are two checkpoints in this data flow, so if any task fails, the other two tasks can continue to run, and the entire data flow can recover from failure and resume data processing.

In a second scenario, it may be determined at runtime that the input data sources are on two remote servers with medium data volume, embodiments disclosed herein may identify plan 2C as optimal, as it separates input/output operations from data processing, while also allowing data processing to occur close to the data locality by running the data flow partially on the parallel engine and partly on the distributed engine. This scenario is similar to the first scenario, but each data source runs its own task within the parallel framework on the specific file server, while the rest of the data flow runs as two map-reduce tasks within the distributed map-reduce framework.

In a third scenario, it may be determined that the data flow has remote I/O with a large data volume. In such a scenario, embodiments disclosed herein may identify plan 6 as being optimal, as it divides resource intensive processing into different tasks. This may allow I/O intensive tasks to run on servers configured for I/O and memory or CPU-intensive tasks to run on the servers configured with more processing power. Six checkpoints make it flexible to handle failure recovery for long running tasks. The map task (sort) and the reduce task (remove duplicates) also fits well in the map-reduce model.

To optimize the plans in Table I on a process level, embodiments disclosed herein combine different processing units into one process to reduce CPU costs spent on data transport. Depending on actual operator combining, the task execution plan may or may not change. For example, plan 2A does not change even if import/sort/remove duplicate operators are combined. Similarly, plan 2B does not change if transform/export operators are combined. If the task execution plan remains unchanged, the process execution plan can be optimized to meet the runtime requirements.

Therefore, embodiments disclosed herein introduce a new task-based model to describe data integration logic, and apply two-level modeling to a data flow. A task-based model may be considered as a composite model that is built on top of a process-based model. The score of a data flow in the task-based model is therefore also a composite score. The two-level modeling uses the process-based model to represent data processing units at a lower level, and use the task-based model at a higher level to perform a main function by grouping correlated data processing units. A composite execution plan having a process execution plan and a task execution plan may be generated based on the characteristics of a data flow and the runtime performance requirements. The process execution plan defines what data processing units to run, while the task execution plan defines where to run those data processing units, and how to run them in terms of environment setup and job launch. Advantageously, embodiments disclosed herein provide the ability to optimize execution plans at both the process level and the task level, and provide capabilities to support built-in and customized rules for data analysis, including checkpointing needs, resource utilization patterns, partitioning and sort keys, and run requirements.

Advantageously, embodiments disclosed herein allow for the reuse of process execution plans in any computing environment, providing support for retargetable engines, failure recovery, and optimal checkpointing. The task-based model can be extended to support parallel data integration in a parallel or distributed (heterogeneous or homogenous) execution environment. Furthermore, the two-level optimization and task analysis rules make the scores for execution plans more adaptive to any performance requirement changes at runtime. At runtime, a user may modify the task execution plan or the process execution plan, or both, or may leave the task execution plan or the process execution plan, or both, unmodified.

FIG. 1 illustrates a system 100 for task-based modeling for parallel data integration, according to one embodiment. The computer 102 may also be connected to other computers $101_{1-N}$ via a network 130. The computers $101_{1-N}$ may be other computers in a distributed or parallel computing environment. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

As shown, the memory 106 contains the integration application 112, which is an application generally configured to deploy parallel computing jobs to a distributed computing environment for execution. The integration application 112 determines the platform on which compute jobs are to be executed, generates an execution plan, configures the platform for execution of the plan, and monitors the execution of the plan. In generating the execution plan, the integration application 112 may generate an optimal plan for executing the parallel computing job on a distributed computing engine based on checkpointing needs, resource utilization patterns, partitioning and sort keys, as well as performance requirements that may be specified by a user at runtime. Additional functionality of the integration application 112 is described in U.S. patent application Ser. No. 13/842,960, filed on Mar. 15, 2013, the entirety of which is incorporated by reference herein. The memory 106 also contains the parallel engine 113, which generally is an application configured to manage the execution parallel computing jobs, and the distributed engine 114, which generally is an application configured to manage the execution of distributed computing jobs. As shown, storage 108 contains data 115, which stores data related to the integration application 112, as well as the parallel engine 113 and distributed engine 114. For example, the data 115 may include configuration data, task data, plan data, and a score archive containing task execution plans. Although depicted as a database, the data 115 may take any form sufficient to store data, including text files, xml data files, and the like. In some embodiments, the data 115, as well as the integration application 112, the parallel engine 113, and the distributed engine 114 may be in any number of different computers, in the same computer, or any combination thereof.

Figure 2:
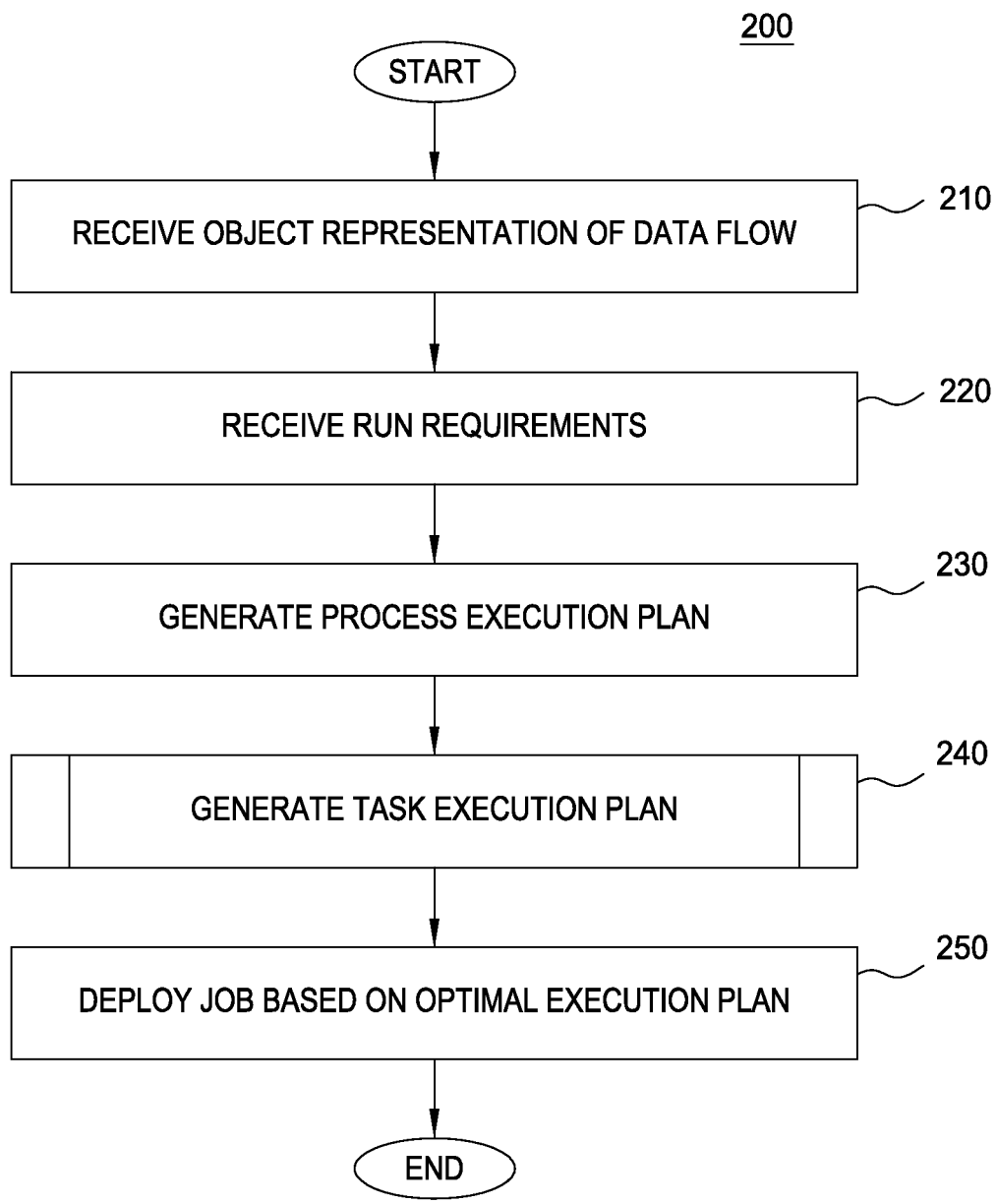
FIG. 2 illustrates a method for task-based modeling for parallel data integration, according to one embodiment.

FIG. 2 illustrates a method 200 for task-based modeling for parallel data integration, according to one embodiment. In one embodiment, the integration application 112 performs the steps of the method 200 to generate an optimal execution plan for a parallel processing job that needs to be executed on a distributed computing system. The integration application 112 includes a set of built-in rules that are applied against a given data flow to generate a task execution plan. The built-in rules may be based on different performance characteristics such that the integration application 112 may generate an optimal execution plan for different types of data flows.

At step 210, the integration application 112 receives an object representation of a data flow for a parallel processing job. The object representation of the data flow identifies the operations that must be completed in order to process the parallel processing job. For example, the object representation of the data flow may specify to import a data set, sort the data, remove duplicates, and output the results to a file. At step 220, the integration application 112 may receive run requirements for processing the data flow. The run requirements may be user-defined, customized rules that may be enforced by the integration application 112. The run requirements may specify, for example, a number of physical partitions, a number of tasks on each logical partition, or a total number of tasks across all partitions in the generated task execution plan. The user may also configure the environment by setting the parallel configuration file to run tasks. The configuration information specified by the user may be embedded in the final task execution plan generated by the integration application 112. At step 230, the integration application 112 may generate a process execution plan for processing the data flow. In one embodiment, the integration application 112 generates the process execution plan based on the object representation of the data flow. Generally, at step 230, the integration application 112 assigns processing operators (units) to processes by determining a partition source for each operator, inserting automatic repartitioning operators and datasets if necessary, computing the straight-through optimization for virtual datasets, and combines operators if possible. Generating a process execution plan is described in greater detail in U.S. patent application Ser. No. 13/842,960, filed Mar. 15, 2013, the entirety of which is incorporated by reference herein.

At step 240, the integration application 112 generates a task execution plan based on the process execution plan and run requirements. In generating the task execution plan, the integration application 112 may perform task analysis using a set of rules, finalize the task execution plan, and serialize and save the task execution plan as part of a score archive. The steps taken by the integration application 112 to generate the task execution plan is discussed in greater detail with reference to FIG. 3. At step 250, the user may optionally optimize the execution plan by modifying the task execution plan, the process execution plan, or both. Alternatively, the user may decline to modify the task or process execution plans, allowing the system to proceed with the process and task execution plans generated by the integration application 112. At step 260, the integration application 112 may deploy the job based on the optimized execution plan. In one embodiment, the job may be a parallel computing job deployed in a distributed computing environment. However, the parallel computing job may be extended to any number of computing platforms, and vice versa.

Figure 3:
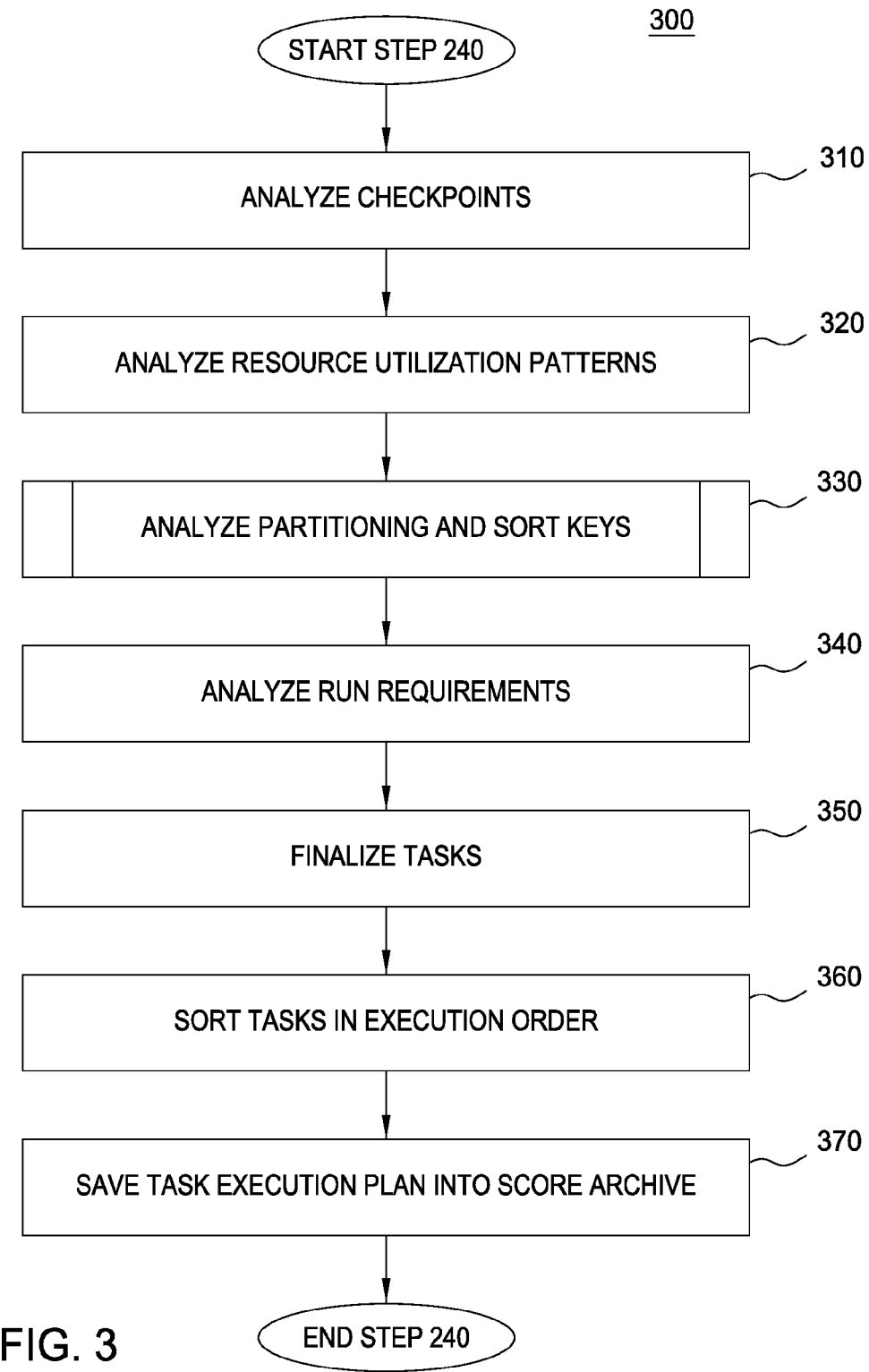
FIG. 3 illustrates a method to generate a task execution plan, according to one embodiment.

FIG. 3 illustrates a method 300 corresponding to step 240 to generate a task execution plan, according to one embodiment. Generally, the integration application 112 generates a task execution plan by receiving the process execution plan and run requirements as input, analyzes the tasks using a set of rules, finalizes the task execution plan, and saves the task execution plan as part of a score archive. The set of rules used for task analysis may include checkpointing needs, resource utilization patterns, partitioning and sort keys, and run requirements received from the user.

At step 310, the integration application 112 may analyze checkpoints for the data flow. Different data flows (or different runs of the same data flow) may have different checkpointing needs. Optimal checkpoints may be determined in a data flow in order to utilize the checkpoints to achieve performance improvement and failure recovery. The information on these checkpoints may be embedded in the process execution plan. When analyzing the process execution plan, the integration application 112 may mark sub-flow boundaries, and determine task groups using the specified checkpoints and sub-flows. A task group may contain one or more tasks. After examining the checkpointing needs, the integration application 112 may analyze each task group to determine individual tasks for processing the data flow. At step 320, the integration application 112 analyzes resource utilization patterns for each task to identify any processes exhibiting special resource utilization patterns. For example, the integration application 112 may determine whether a given task process is I/O intensive, memory intensive, or CPU intensive. If processes are identified as having special resource utilization patterns, the integration application 112 will attempt to assign the processes to different tasks in the task execution plan. For example, the integration application 112 may not assign an I/O intensive process to the same task as a CPU intensive process. Likewise, the integration application 112 does not assign multiple memory intensive processes, multiple CPU intensive processes, and multiple I/O intensive processes to the same task.

At step 330, discussed in greater detail with reference to FIG. 4, the integration application 112 may analyze partitioning and sort keys to map the remaining processes to tasks. Generally, the integration application 112 identifies key break boundaries to define map tasks and reduce tasks in the task execution plan. At step 340, the integration application 112 analyzes any run requirements specified by the user. As previously discussed, the integration application 112 finalizes the task execution plan based on these user-specified rules. For example, the integration application 112 may modify tasks it generates such that a specified number of physical partitions, a specified number of tasks on each logical partition, or a specified total number of tasks across all partitions are not exceeded. At step 360, the integration application 112 sorts the generated tasks in the appropriate execution order. At step 370, the integration application 112 may save the task execution plan into a score archive, which in one embodiment is the data 115.

Figure 4:
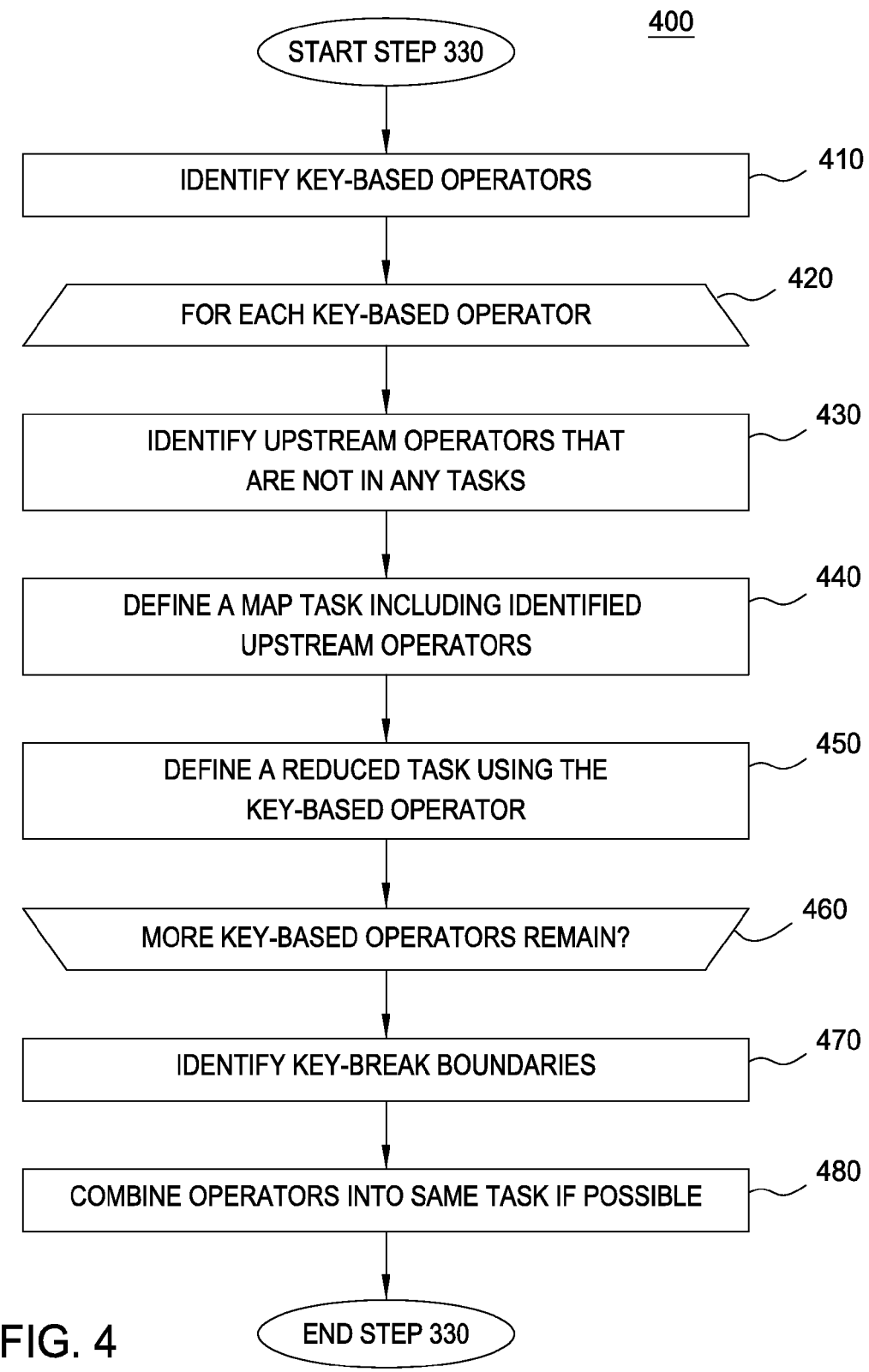
FIG. 4 illustrates a method to analyze partitioning and sort keys, according to one embodiment.

FIG. 4 illustrates a method 400 corresponding to step 330 to analyze partitioning and sort keys, according to one embodiment. Generally, the integration application 112 performs the steps of the method 400 after analyzing checkpointing needs and resource utilization patterns in order to map any remaining processes to tasks in the task execution plan. At step 410, the integration application 112 may identify key-based operators. A key-based operator may be any operator that performs operations on partitioning or sorting keys. Partitioning or sorting keys may be one or multiple columns that are used to determine the partitioning or sorting for a set of records. At step 420, the integration application 112 executes a loop containing steps 430-460 for each key-based operator identified at step 410. At step 430, the integration application 112 identifies any operator upstream from current the key-based operator not currently used in any tasks. At step 440, the integration application 112 defines a map task including the identified upstream operators. At step 450, the integration application 112 defines a reduce task using the key-based operator. At step 460, the integration application 112 determines whether more key-based operators remain. If so, the integration application 112 returns to step 420. Otherwise, the integration application 112 identifies key-break boundaries at step 470. If the downstream key-based operators have the same key requirements, the integration application 112 may combine those key-based operators into the same reduce task. At step 480, the integration application 112 combines as many operators as possible into the same task.

Embodiments disclosed herein receive an object representation of a data flow and a process execution plan as input, and generate a task execution plan based on checkpointing needs, resource utilization patterns, partitioning and sort keys, as well as performance requirements that may be specified by a user at runtime. The data flow may be modeled as a set of tasks, each task having a main function that may be performed by one or more data processing units. The main functions of all tasks are orchestrated to represent the application logic of the entire data flow. Advantageously, embodiments disclosed herein identify an optimal number of tasks for the processing units by considering the characteristics of the data flow and the performance requirements. Based on the generated set of optimal tasks, embodiments disclosed herein can then generate a two-level optimal composite execution plan for running parallel compute jobs in a distributed computing environment.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the integration application) or related data available in the cloud. For example, the integration application could execute on a computing system in the cloud and generate an optimal execution plan for processing a data flow. In such a case, the integration application could generate the execution plan and store the execution plan at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
one or more computer processors; and
a memory containing a program which when executed by the one or more computer processors performs an operation, the operation comprising:
    determining, for a data flow, a set of processing units, each processing unit of the set of processing units defining one or more data processing operations to process the data flow, wherein the determination of the set of processing units comprises:
        determining a partition source to associate with each processing unit,
        inserting one or more processing units into the set to automatically repartition the partition source associated with at least one of the processing units, and
        optimizing virtual datasets associated with the dataflow;
    generating a set of tasks to represent the set of processing units, each task in the set of tasks comprising one or more of the data processing operations of the set of processing units;
    optimizing the set of tasks based on a set of characteristics of the data flow comprising one or more user defined requirements;
    determining an execution order for the set of tasks based on the one or more user defined requirements;
    generating a composite execution plan based on the optimized set of tasks to process the data flow in a distributed computing environment and the execution order.

2. The system of claim 1, wherein the set of characteristics of the data flow further comprise: (i) a checkpointing requirement of the data flow, (ii) a processing requirement for each of the processing units, and (iii) analyzing one or more keys for each of the processing units.

3. The system of claim 2, wherein analyzing the one or more keys for each of the processing units comprises:
identifying at least one key-based processing unit in the set of processing units;
identifying an upstream processing unit from the at least one key-based processing unit, wherein the upstream processing unit is not used processing any tasks of the set of tasks;
defining a map task including the upstream processing unit;
defining a reduce task using the at least one key-based processing unit; and
upon determining that the upstream processing unit and the at least one key-based processing unit have the same key requirements, combining the upstream processing unit and the at least one key-based processing unit.

4. The system of claim 1, wherein the one or more user defined requirements comprise: (i) a number of physical partitions for processing the data flow, (ii) a number of tasks on one or more logical partitions, (iii) a maximum number of tasks across all partitions.

5. The system of claim 2, wherein the processing requirement for each of the processing units comprises at least one of: (i) a memory requirement of each processing unit, (ii) a CPU requirement of each processing unit, and (iii) an I/O requirement of each processing unit.

6. The system of claim 1, wherein the composite execution plan is further generated based on a determined set of processing units.

7. The system of claim 6, wherein determining the set of processing units is based on combining at least two processing units based on one or more processing requirements of the at least two processing units.

8. A computer program product, comprising:
a computer-readable storage medium having computer-readable program code embodied therewith, the computer-readable program code comprising:
  computer-readable program code configured to determine, for a data flow, a set of processing units, each processing unit of the set of processing units defining one or more data processing operations to process the data flow, wherein the determination of the set of processing units comprises:
    determining a partition source to associate with each processing unit,
    inserting one or more processing units into the set to automatically repartition the partition source associated with at least one of the processing units, and
    optimizing virtual datasets associated with the dataflow;
  computer-readable program code configured to generate a set of tasks to represent the set of processing units, each task in the set of tasks comprising one or more of the data processing operations of the set of processing units;
  computer-readable program code configured to optimize the set of tasks based on a set of characteristics of the data flow comprising one or more user defined requirements;
  computer-readable program code configured to determine an execution order for the set of tasks based on the one or more user defined requirements;
  computer-readable program code configured to generate a composite execution plan based on the optimized set of tasks to process the data flow in a distributed computing environment and the execution order.

9. The computer program product of claim 8, wherein the set of characteristics of the data flow further comprise: (i) a checkpointing requirement of the data flow, (ii) a processing requirement for each of the processing units, and (iii) analyzing one or more keys for each of the processing units.

10. The computer program product of claim 9, wherein analyzing the one or more keys for each of the processing units comprises:
  identifying at least one key-based processing unit in the set of processing units;
  identifying an upstream processing unit from the at least one key-based processing unit, wherein the upstream processing unit is not used processing any tasks of the set of tasks;
  defining a map task including the upstream processing unit;
  defining a reduce task using the at least one key-based processing unit; and upon determining that the upstream processing unit and the at least one key-based processing unit have the same key requirements, combining the upstream processing unit and the at least one key-based processing unit.

11. The computer program product of claim 8, wherein the one or more user defined requirements comprise: (i) a number of physical partitions for processing the data flow, (ii) a number of tasks on one or more logical partitions, (iii) a maximum number of tasks across all partitions.

12. The computer program product of claim 9, wherein the processing requirement for each of the processing units comprises at least one of: (i) a memory requirement of each processing unit, (ii) a CPU requirement of each processing unit, and (iii) an I/O requirement of each processing unit.

13. The computer program product of claim 8, wherein the composite execution plan is further generated based on a determined set of processing units, wherein determining the set of processing units is based on combining at least two processing units based on one or more processing requirements of the at least two processing units.

* * * * *